United States Patent
Palm et al.

(10) Patent No.: US 10,120,845 B1
(45) Date of Patent: Nov. 6, 2018

(54) SYSTEMS AND METHODS FOR UPDATING SUBSETS OF ELEMENTS OF ELECTRONIC DOCUMENTS

(71) Applicant: Google Inc., Mountain View, CA (US)

(72) Inventors: Jeffrey de Blanc Palm, New York, NY (US); Lindsay Grace Hall, Brooklyn, NY (US); Gregory George Galante, Little Silver, NJ (US); Victoria Hsiao-tsung Chou Fritz, Maplewood, NJ (US)

(73) Assignee: GOOGLE LLC, Mountain View, CA (US)

( * ) Notice: Subject to any disclaimer, the term of this patent is extended or adjusted under 35 U.S.C. 154(b) by 46 days.

(21) Appl. No.: 14/703,807

(22) Filed: May 4, 2015

(51) Int. Cl.
*G06F 17/24* (2006.01)
*G06F 17/22* (2006.01)
*G06F 17/30* (2006.01)

(52) U.S. Cl.
CPC .......... *G06F 17/2247* (2013.01); *G06F 17/24* (2013.01); *G06F 17/30011* (2013.01); *G06F 17/30312* (2013.01)

(58) Field of Classification Search
CPC ................. G06F 17/2247; G06F 17/24; G06F 17/30011; G06F 17/30312
USPC ........................................................ 715/234
See application file for complete search history.

(56) References Cited

U.S. PATENT DOCUMENTS

| | | | |
|---|---|---|---|
| 7,596,747 B2 | 9/2009 | Spada | |
| 8,321,435 B2* | 11/2012 | Zaydman | G06F 17/30595 707/755 |
| 8,572,482 B2* | 10/2013 | Yuan | G06F 17/2785 715/243 |
| 8,667,411 B2 | 3/2014 | Miyoshi | |
| 2007/0050700 A1 | 3/2007 | Simkhay et al. | |
| 2008/0301560 A1 | 12/2008 | Rogers et al. | |

OTHER PUBLICATIONS

"Alternating row color and column shading in Excel (banded rows and columns);" Svetlana Cheusheva; AbleBits; <https://www.ablebits.com/office-addins-blog/2014/03/13/alternate-row-column-colors-excel/>; Published prior to Mar. 16, 2014.*
Control the Formatting When You Paste Text, downloaded form the internet on Dec. 2, 2014 at: https://support.office.com/en-nz/article/Control-the-fromatting-when-you-paste-text-20156a41-520e-48a6-8680-fb9ce15bf3d6, 9 pages.

* cited by examiner

*Primary Examiner* — Stephen S Hong
*Assistant Examiner* — Broderick C Anderson
(74) *Attorney, Agent, or Firm* — Lowenstein Sandler LLP

(57) ABSTRACT

Systems and methods may include updating subsets of elements of electronic documents. Associations of types of mutations, mutation locations, and subsets to update are stored in a database. A mutation to the element is received, and a type and location of the mutation are determined. Based on a stored association, a subset of the element is determined. The determined subset is associated with the determined type and determined location. The element is updated by updating the subset, and the updated element is displayed on a user device.

21 Claims, 14 Drawing Sheets

| TYPE OF RECEIVED MUTATION | | CONDITIONAL STYLE PRESENT | LOCATION OF RECEIVED MUTATION | LOCATIONS TO UPDATE CONDITIONAL STYLES |
|---|---|---|---|---|
| 302 | | 304 | 306 | 308 |
| TABLE ROW INSERTION 330 | 312 320 | 322 ROW BANDING | 324 ANY INSERTION LOCATION | 326 ROWS AT AND ADJACENT TO INSERTION LOCATION |
| | | | | 328 ALL ROWS BELOW INSERTION LOCATION |
| | | 332 ROW-LOCATION-SPECIFIC STYLES | 334 INSERTION AT OR ABOVE SPECIFIED ROW LOCATION? | 336 ROWS AT AND ADJACENT TO INSERTION LOCATION |
| | | | | 338 ROWS AT AND ADJACENT TO SPECIFIED ROW LOCATION |
| | 340 | 342 CELL-LOCATION-SPECIFIC STYLES | 344 INSERTION AT OR ABOVE SPECIFIED CELL LOCATION? | 346 CELLS AT AND ADJACENT TO INSERTION LOCATION |
| | | | | 348 CELLS AT AND ADJACENT TO SPECIFIED CELL LOCATION |
| TABLE COLUMN INSERTION | 352 | COLUMN BANDING | ANY INSERTION LOCATION | COLUMNS AT AND ADJACENT TO INSERTION LOCATION |
| | | | | ALL COLUMNS RIGHT OF INSERTION LOCATION |
| | | COLUMN-LOCATION-SPECIFIC STYLES | INSERTION AT OR LEFT OF SPECIFIED COLUMN? | COLUMNS AT AND ADJACENT TO INSERTION LOCATION |
| | | | | COLUMNS AT AND ADJACENT TO SPECIFIED ROW LOCATION |
| | | CELL-LOCATION-SPECIFIC STYLES | INSERTION AT OR LEFT OF SPECIFIED CELL LOCATION? | CELLS AT AND ADJACENT TO INSERTION LOCATION |
| | | | | CELLS AT AND ADJACENT TO SPECIFIED CELL LOCATION |

FIG. 3A

| TYPE OF RECEIVED MUTATION | CONDITIONAL STYLE PRESENT | LOCATION OF RECEIVED MUTATION | LOCATIONS TO UPDATE CONDITIONAL STYLES |
|---|---|---|---|
| TABLE ROW DELETION _362_ | ROW BANDING | ANY DELETION LOCATION | ROWS AT AND ADJACENT TO DELETION LOCATION |
| | | | ALL ROWS BELOW DELETION LOCATION |
| | ROW-LOCATION-SPECIFIC STYLES | DELETION AT OR ABOVE SPECIFIED ROW LOCATION? | ROWS AT AND ADJACENT TO DELETION LOCATION |
| | | | ROWS AT AND ADJACENT TO SPECIFIED ROW LOCATION |
| | CELL-LOCATION-SPECIFIC STYLES | DELETION AT OR ABOVE SPECIFIED CELL LOCATION? | CELLS AT AND ADJACENT TO DELETION LOCATION |
| | | | CELLS AT AND ADJACENT TO SPECIFIED CELL LOCATION |
| TABLE COLUMN DELETION _372_ | COLUMN BANDING | ANY DELETION LOCATION | COLUMNS AT AND ADJACENT TO DELETION LOCATION |
| | | | ALL COLUMNS RIGHT OF DELETION LOCATION |
| | COLUMN-LOCATION-SPECIFIC STYLES | DELETION AT OR LEFT OF SPECIFIED COLUMN? | COLUMNS AT AND ADJACENT TO DELETION LOCATION |
| | | | COLUMNS AT AND ADJACENT TO SPECIFIED ROW LOCATION |
| | CELL-LOCATION-SPECIFIC STYLES | DELETION AT OR LEFT OF CELL LOCATION? | CELLS AT AND ADJACENT TO DELETION LOCATION |
| | | | CELLS AT AND ADJACENT TO SPECIFIED CELL LOCATION |

| | |
|---|---|
| 602 — THE | QUICK |
| 604 — BROWN | FOX |
| 606 — JUMPED | OVER |
| 608 — THE | LAZY |

630

| | |
|---|---|
| 632 — THE | QUICK |
| 634 — BROWN | FOX |
| 635 — DOG'S | BACK |
| 636 — JUMPED | OVER |
| 638 — THE | LAZY |

660

| | |
|---|---|
| 662 — THE | QUICK |
| 664 — BROWN | FOX |
| 665 — DOG'S | BACK |
| 666 — JUMPED | OVER |
| 668 — THE | LAZY |

| 702 | THE | QUICK |
| --- | --- | --- |
| 704 | BROWN | FOX |
| 706 | JUMPED | OVER |
| 708 | THE | LAZY |

730

| 731 | DOG'S | BACK |
| --- | --- | --- |
| 732 | THE | QUICK |
| 734 | BROWN | FOX |
| 736 | JUMPED | OVER |
| 738 | THE | LAZY |

760

| 761 | DOG'S | BACK |
| --- | --- | --- |
| 762 | THE | QUICK |
| 764 | BROWN | FOX |
| 766 | JUMPED | OVER |
| 768 | THE | LAZY |

FIG. 7

SYSTEMS AND METHODS FOR UPDATING SUBSETS OF ELEMENTS OF ELECTRONIC DOCUMENTS

FIELD OF THE INVENTION

In general, this disclosure relates to updating elements of electronic documents having conditional styles.

BACKGROUND

Elements of electronic documents can have conditional styles, meaning that one or more properties of the elements have values that are determined based on the position of items within the elements. When applying mutations to elements with conditional styles, it is necessary to update items of the elements affected by the mutations.

SUMMARY

Accordingly, systems and methods are described herein for updating properties of an element of an electronic document. A processor stores a plurality of associations of types of mutations, mutation locations and subsets of the element to update in a database. The processor receives a mutation to the element. The processor determines a type of the mutation and a location of the mutation. The processor determines a subset of the element that is associated with the determined type and determined location, based on an association of the plurality of associations. The processor updates the element by updating the subset. The updated element is displayed on a user device.

In some aspects, properties of the determined subset associated with a conditional style of the element are updated. In some aspects, updating the element does not include updating portions of the element excluded from the determined subset.

In some aspects, the processor determines the subset by determining that a record in the database associates the type of the mutation with a relative location of the subset, the conditional style, or both.

In some aspects, the processor determines the subset by determining that the subset is an empty subset based on the conditional style, the determined type, a type of user device, or any combination of these. The processor can determine the type of user device displaying the electronic document.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIGS. 3A and 3B depict sets of records used to associate types of mutations with conditional styles, locations of the mutations, and locations to be updated, according to an illustrative implementation;

FIG. 6 depicts three successive renderings of a table with a cell border conditional style while undergoing insertion of a row, according to an illustrative implementation;

FIG. 7 depicts three successive renderings of a table with a row-location-specific cell paragraph conditional style while undergoing insertion of a row, according to an illustrative implementation;

DETAILED DESCRIPTION

Figure 1:
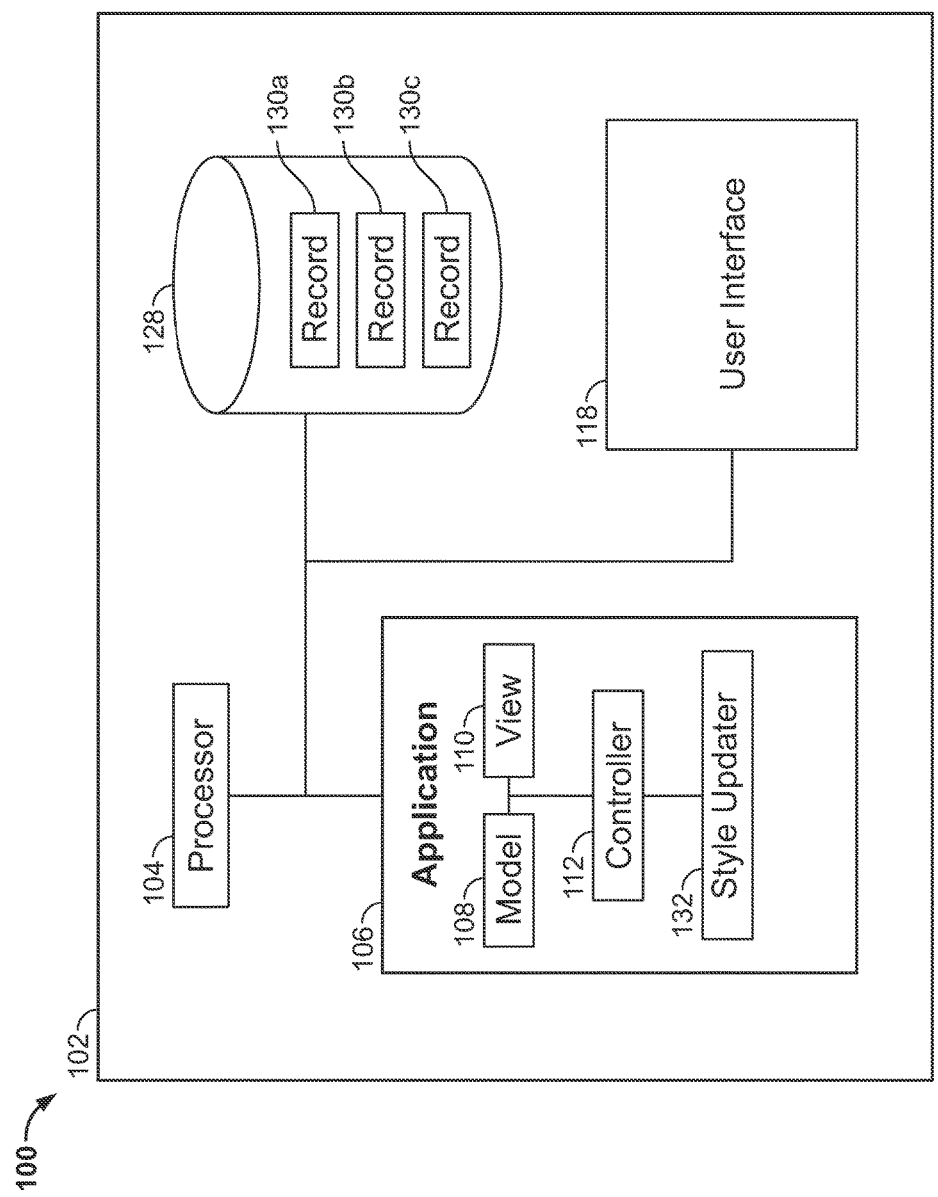
FIG. 1 depicts a system including a user device for updating a subset of an element of an electronic document based on one or more conditional styles, according to an illustrative implementation.

To provide an overall understanding of the disclosure, certain illustrative implementations will now be described, including a system for updating subsets of elements of electronic documents. In particular, a system is described in which subsets are precomputed and then updated upon receiving mutations to the electronic documents. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more components, which include a processing device or devices, such as a computer, microprocessor, logic device or other device or processor that is configured with hardware, firmware, and software to carry out one or more of the computerized methods described herein.

As used herein, a property is a characteristic of an element of an electronic document that is associated with a value. A table is an example of an element of an electronic document having one or more properties. Some examples of properties of table cells are "background color," "width," "height," "top border width," "bottom border width," "left border width," "right border width," "top margin," "bottom margin," "left margin," "right margin," "horizontal alignment," "vertical alignment," and other characteristics of table cells known in the art. As used herein, a property does not fully define the characteristic unless a value is associated with the property. A value is a quantitative metric used to define the characteristic. Examples of values are colors such as "red" and "green," numbers such as "2" and "0.856," and sets of numbers such as "[0,1]" and "[1.68, 2.52, 3.91]." Colors can be represented as numbers such as RGB triplets defining the relative proportions of red, green, and blue in the color. For example, the RGB triplet representing "red" is "[1,0,0]," and the RGB triplet representing "green" is "[0,1,0]."

Tables are elements in electronic documents that can have conditional styles, meaning that values of properties for cells of the table can depend on the relative location of cells in the table. For example, a table may have a conditional style defining a banded structure, in which odd rows have a red background color and even rows have a green background color. If a row is inserted at the top of the table, the conditional style requires that the background colors of the individual cells change to preserve the banded structure of the table. Thus, the inserted first row would have a red background color, and the original first row (now the second row) would now have a green background color. In another example, a table may have a conditional style defining that a cell's property values based on the cell's position relative to another cell within the table. In this illustrative example, a table may be formatted such that if any first cell is directly above a second cell containing the text, "SUM," the first cell has a background color of red and all other cells in the table have a background color of white. If a row is inserted into the table to insert a third cell between the first and second cells, the conditional styles would require changing the first cell's background color to "white" and the third cell's background color to "red." These examples are illustrative, and conditional styles can specify other property values based on other relationships in a similar manner.

Another type of conditional style that can be applied to a table is a location-specific conditional style. A location-specific conditional style specifies the formatting of a cell based on the cell's location in the table. The location can be specified by using the cell's row index, the cell's column index, or both. For example, a conditional style can require that all cells in a specified row of the table have a specified style. Furthermore, a conditional style can require that all cells in a specified column have a specified style. In some examples, conditional styles can require that cells in certain positions within the table, such as cells with a specified combination of row and column indices, have a specified style.

In some examples, a list is an element of an electronic document with conditional styles. In these examples, conditional styles can be used to specify styles of an item of a list based on the item's position in the list. In some examples, the list may be a bulleted or numbered list. For example, a conditional style in a bulleted list may require that the second item of the list have a specified style. If an item is added to the list above the second item, the conditional style would require that the new second item be formatted according to the specified style, and the third item be no longer formatted according to the specified style. These specified styles can be any of the styles described herein, such as background color, cell padding, and paragraph style.

Elements in electronic documents can inherit styles, properties, and values from other elements. When an element inherits properties from another element, values for the inherited properties are determined by reference to the other element of the document, such as a parent or source element. In an example, a document element may have a "font" property with an associated value "Times New Roman," and the text within a table cell may inherit from the document element. Here, the table cell will not be associated with an explicit value for the "font" property. Instead, the rendering module of the application will determine that the value for the "font" property should be the value of "Times New Roman" inherited from the document element. Thus, if the document font is changed, the font of the table cell will change. A document object model (DOM) may be used to determine from which element another element should inherit. A DOM is a hierarchical structure of elements or nodes, with each element having zero or one parent elements and zero, one, or more child elements. The rendering module will determine the element from which another element should inherit by utilizing a set of rules. The rules may be embedded in the application, and may be associated with the file format of the document. In some examples, the rules can require the use of the DOM hierarchy to determine the value of an inheriting property. For example, a rendering module may start at the element in question and traverse up the hierarchy until an element with a value defined for the property in question is reached. The rendering module will then assign this value to the element in question.

Electronic documents can be stored in files and edited by applications. An application generally has its own associated native file format which specifies encoding of the features that the application supports. Applications will typically handle properly only those features which are supported by the application's native format. Any features which are unsupported by the application's native format will encounter problems loading or will load incorrectly. Thus, pasting an element into a destination application, if the element was created with a different source application, can cause loss of data. In particular, this occurs when the element has features that are not supported by the destination application.

A file may have a file format which determines the manner in which the file's information is encoded into bits in memory, and further, the manner in which that information is decoded from memory and presented to a user. Generally speaking, a file has a file format that is based on the application that was used to create the file, such as the application's native file format. File formats may be simple or complex. A simple file format is the American Standard Code for Information Interchange (ASCII), which encodes plain text and some simple characters. An example of a complex file is the format used to encode information in a word processing document. A word processing format may, for example, specify the encoding method for fonts, font sizes, font styles, font colors, tabs, paragraphs, bulleted lists, numbered lists, tables, text wrapping, text alignment, text highlighting, line spacing, page breaks, page size, margins, columns, headers, footers, footnotes, endnotes, cross-references, tables of contents, indices, and embedded content such as images and video. A spreadsheet format is also complex and may specify the encoding method for cell contents, formula operations, fonts, font sizes, font styles, font colors, cell borders, cell colors, and charts. A presentation format is also complex and may specify the encoding method for fonts, font sizes, font styles, font colors, text boxes, shapes, slide size, position and arrangement of items within a slide, slide ordering, slide transitions, animations, and embedded content such as images, video, and spreadsheets. Formats may specify the manner in which elements inherit from other elements. Formats may also specify the manner in which conditional styles and raw styles are resolved into concrete values.

File formats may incorporate other formats. For example, word processing, spreadsheet, and presentation formats may all incorporate the ASCII format to encode text, but may use additional encoding methods specific to the format to encode features other than text. A file containing a document may be encoded according to a format appropriate to the document. A file may contain a word processing document, a spreadsheet document, a presentation document, a drawing document, a database document, a HyperText Markup Language (HTML) document, an Extensible Markup Language (XML) document, an image document, a text document, or any other document containing user data. When opening and editing a file, an application utilizes the file's format to decode the bits stored in memory and present the decoded information to a user.

FIG. 1 depicts a system 100 for updating a subset of an element of an electronic document based on one or more conditional styles. The system 100 includes a user device 102 which can be used to display and edit the electronic document. The user device 102 includes a processor 104, an application 106, a database 128, and a user interface 118. The application 106 can be stored as a set of instructions in a memory of the user device 102, such as the database 128 or another transitory or non-transitory memory of the user device 102. The processor 104 can execute the stored instructions to run the application 106. The application 106 includes a model module 108, a view module 110, and a controller module 112. Together, the model module 108, the view module 110, and the controller module 112 can be used in conjunction to display and edit an electronic document using a model-view-controller paradigm. The application 106 also includes a style updater module 132. Using the systems and methods described herein, the style updater module 132 can update subsets of an element of an electronic document displayed and edited by the application 106. The application 106 can contain other modules to implement other functions of displaying and editing electronic documents.

The database 128 contains database records 130a, 130b, and 130c (collectively, records 130), which can store data associated with applications and electronic documents. In some examples, one or more records of records 130 stores instructions for running the application 106. In some examples, one or more records of the records 130 stores the electronic document being displayed and edited by the application 106. In some examples, one or more of the records 130 contains associations used to update subsets of elements of the electronic document, as will be described in more detail with respect to FIG. 3. In some examples, the database 128 has a number of records different from the number depicted in FIG. 1.

The user interface 118 can include a display for displaying the electronic document to a user. The user interface 118 can also include a user input device to receive user modifications to the electronic document. By facilitating communication between the application 106, the style updater module 132, and the database 128, the system 100 can provide document display, editing, and updating of subsets of elements of the electronic documents in a single device 102.

Figure 2:
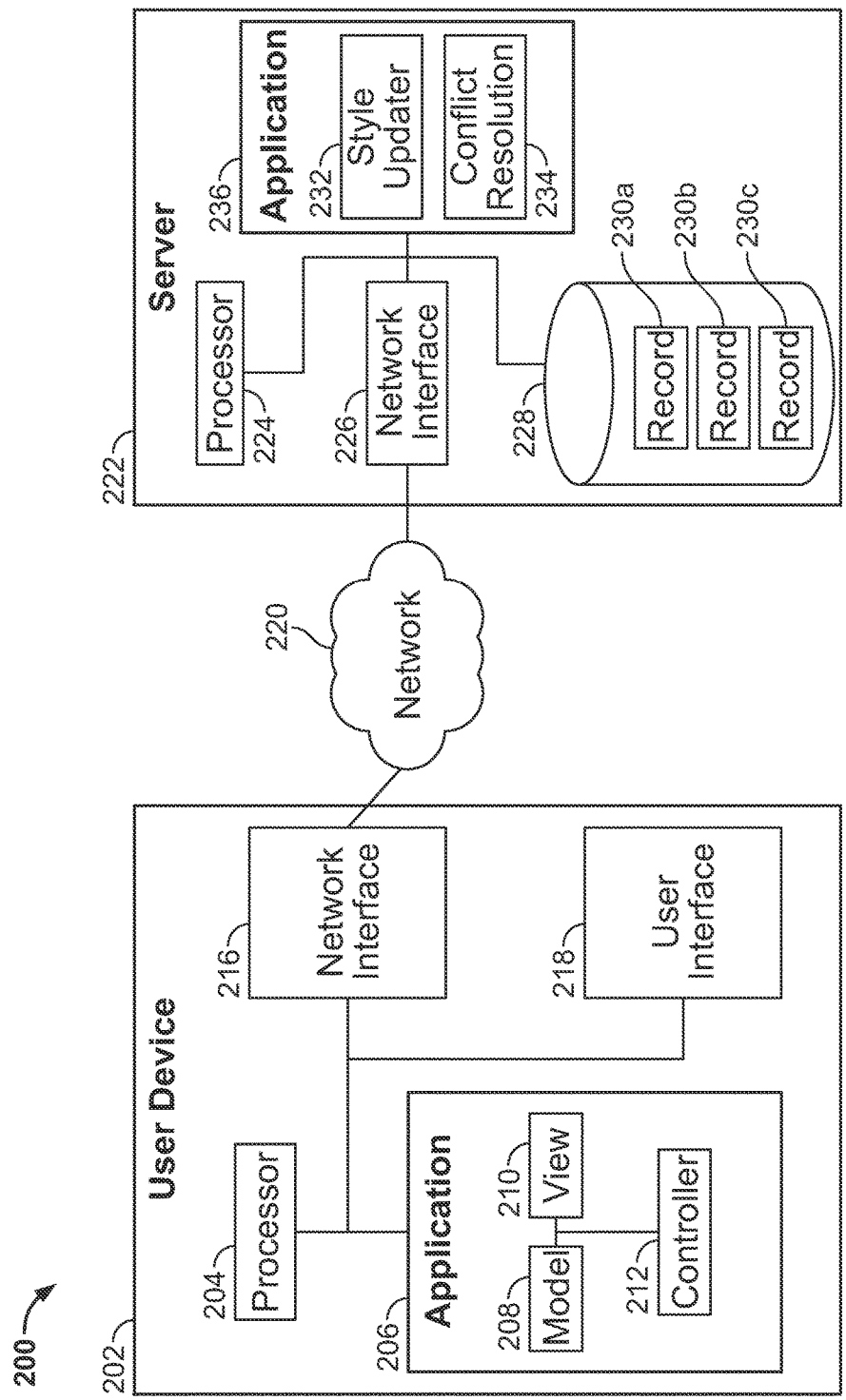
FIG. 2 depicts a networked system for updating a subset of an element of an electronic document based on one or more conditional styles, according to an illustrative implementation.

FIG. 2 depicts a system 200 for updating a subset of an element of an electronic document based on one or more conditional styles. The system 200 includes a user device 202 and a server 222, in communication with each other via a network 220. The user device 202 includes a processor 204, an application 206, a network interface 216, and a user interface 218. The user device 202 can include a memory for storing instructions used by the processor to execute the application 206. The application 206 can include a model module 208, a view module 210, and a controller module 212. Together, the model module 208, the view module 210, and the controller module 212 can display and edit an electronic document using a model-view-controller paradigm. The user interface can include a display for displaying the electronic document and a user input device for receiving data modifications to the electronic document. The network interface 216 communicates with the network 220 to receive data sent to the user device to via the network 220, and to transmit data from the user device to via the server 222 and other devices.

The network 220 can be a network such as the Internet, the World Wide Web, a local area network, a wide-area network, an intranet, a cellular network, or another telecommunications network.

The server 222 includes a processor 224, a network interface 226, a database 228, and an application 236. The server 222 and also include a memory storing instructions used by the processor 224 to run the application 236. The network interface 226 can be used to receive data from the user device 202 and transmit data to the user device 202. The application 236 includes a style updater module 232 and a conflict resolution module 234. The style updater 232 can perform functions similar to the functions performed by the style updater 132. The conflict resolution module 234 can resolve conflicts arising in situations in which an electronic document is edited by one or more users using a plurality of devices simultaneously. In these situations, the server 222 can receive edits to the electronic document from two or more devices, and these edits can conflict with each other. The conflict resolution module 234 can resolve these conflicts to present the same document for display to each of the devices.

The database 228 can perform functions similar to functions performed by the database 128. The database 228 includes three records, records 230a, 230b, and 230c (collectively, records 230). Records 230 and store instructions to execute the application 236, data files for electronic documents, and/or associations used by the style updater module 232 to update subsets of an element of an electronic document based on one or more conditional styles. While the database 228 is depicted as containing three records 230, the database 228 can contain any number of records.

In the distributed document editing system 200, document editing functions are distributed between the user device 202 and the server 222. The user device 202 displays the electronic document to a user and receives edits to the electronic document from the user. In conjunction with the user device 202, the server 222 provides other document editing functions via the application 236, such as style updating and conflict resolution. The server 222 can also store data files in the database 228, thus making the electronic document accessible from a plurality of user devices. In addition, remote document storage reduces the storage capacity required on the user device 202. For purposes of clarity, FIG. 2 depicts the system 200 as containing one user device 202 and one server 222. In some examples, the system 200 can contain more than one user device. In some examples, the system 200 can contain more than one server. By distributing document editing functionality between the user device 202 and the server 222, the system 200 allows for flexibility in choice of user device. In this way, software and hardware requirements for the user device 202 are reduced, and multiple user devices may be used to display and edit the electronic document.

Any of the functions described herein as being performed by the system 100 or its components, such as the application 106 and the style updater 132, can be performed by the system 200 or its corresponding components, such as the application 206, the application 236, and the style updater 232.

FIGS. 3A and 3B depict a set of records 300a and a set of records 300b (collectively, set of records 300) used to associate types of mutations with conditional styles, locations of the mutations, and locations to be updated. The set of records 300 includes four records 310, 350, 360, and 370. The records 310, 350, 360, and 370 represent some examples of records 130 in the database 128 and records 230 in the database 228. Each record in the set of records 300 includes one or more items and each of four categories 302, 304, 306, and 308. The category 302 includes entries for types of mutation to an electronic document received by either any of the applications 106, 206, and 236. These received mutations can be insertion or deletion of table rows, insertion or deletion of table columns, insertion or deletion of items in a list, or other mutations to elements of an electronic document.

The category 304 includes entries for types of conditional styles that may be present in elements of an electronic document. These conditional styles may be any of the conditional styles described herein. The category 306 includes entries for locations of the received mutation. These locations may be specified relative to the position of the mutation within an element of the electronic document, or these locations may be specified relative to the position of the mutation within the electronic document. The category 308 includes entries specifying locations within an element of an electronic document at which conditional styles for the element should be updated, based on associations stored in the set of records 300.

The record 310 includes a single entry 312 in the category 302. The entry 312 indicates the record 310 relates to an insertion of a row into a table. Thus, the record 310 contains associations to be used when a table row is inserted into a table of an electronic document. The record 310 includes three entries 314, 316, and 318 in the category 304.

Each record in the set of records 300 contains one or more sub-records. The record 310 contains three sub-records, sub-records 320, 330, and 340. For purposes of clarity in the following discussion, the interaction between the style updater 132 and the set of records 300 will be described. However, in some examples, the style updater 232 can perform some or all of the functions described herein as being performed by the style updater 132. A style updater, such as the style updater 132 or the style updater 232, uses the set of records 300 in the following manner to determine locations of an element at which styles should be updated.

When the style updater 132 receives a mutation to an element of an electronic document, the style updater 132 determines a type of the received mutation. The style updater 132 searches the set of records 300 to determine if a record in the set of records 300 has an entry in the category 302 associated with the type of received mutation. If a record in the set of records 300 has an entry in the category 302 associated with the type of received mutation, the style updater 132 reads data from the associated record to determine locations of the element at which conditional styles should be updated. In an illustrative example, the received mutation is a table row insertion, and the style updater 132 determines that the record 310 is associated with table row insertions. The style updater 132 makes this determination by determining that the record 310 contains an entry 312 in the category 302 indicating that the record 310 is associated with table row insertions.

After selecting the record 310, the style updater 132 determines whether the element to be modified by the received mutation contains conditional styles associated with the record 310. The record 310 contains three sub-records 320, 320, and 340, each associated with a type of conditional style. The sub-record 320 contains an entry 322 in the category 304 indicating that the sub-record 320 is associated with a row banding conditional style. The sub-record 330 contains an entry 332 in the category 304 indicating that the sub-record 330 is associated with a row-location-specific conditional style. The sub-record 340 contains an entry 342 in the category 304 indicating that the sub-record 340 is associated with a cell-location-specific conditional style. Thus, the style updater 132 determines whether the element of the electronic document contains a conditional style associated with the record 310 by searching sub-records of the record 310 to determine if a sub-record of the record 310 is associated with conditional styles of the element.

After determining that a sub-record is associated with a conditional style of the element, the style updater 132 determines whether the location of the received mutation requires updating of the element's conditional styles. The style updater 132 determines whether updating is required by determining the location of the received mutation and then determining whether the mutation location is associated with the sub-record. The style updater 132 determines whether the mutation location is associated with the sub-record by searching the selected sub-record for entries in the category 306.

In an example, the element is a table, the received mutation is a table row insertion, and the table has a conditional style of row banding. In this example, the style updater 132 selects the record 310 and the sub-record 320. The style updater determines the location within the table of the received mutation and compares this to any entries in the category 306 of the sub-record 320. The sub-record 320 contains an entry 324 in the category 306 that associates the sub-record 320 with any insertion location. Thus, for a table row banding property, the style updater 132 will update conditional styles, regardless of the location of the row insertion.

After determining, using the entry 324, that the table should be updated based on the conditional styles present, the style updater 132 searches any entries in the category 308 of the sub-record 320 to determine locations of the table at which conditional styles should be updated. The sub-record 320 contains entries 326 and 328 in the category 308. The entry 326 indicates that conditional styles should be updated for rows at and adjacent to the insertion location. The entry 328 indicates that the conditional styles should be updated for rows at and below the insertion location. Thus, the sub-records 326 and 328 in the category 308 indicate locations of cells in the table for which their conditional styles may be affected by the received mutation, and excludes locations of cells in the table for which their conditional styles will not be affected by the received mutation. Thus, the sub-records 326 and 328 indicate that insertion of a table row may affect the row banding style of rows at, adjacent to, and below the insertion location, allowing the style updater 132 to only update the row banding style of cells in those locations. The cells in the locations specified by the sub-records 326 and 328 comprise a subset of cells to update. The style updater 132 updates only cells in the subset, since cells not in the subset will not be affected by the received mutation and do not require updating. By only updating the row banding style of cells specified in the entries 326 and 328, the style updater 132 improves the efficiency of the application 106 when handling conditional styles.

The sub-records 330 and 340 share a structure similar to the structure of the sub-record 320. The sub-record 330 contains an entry 322 in the category 304 indicating that the sub-record 330 is associated with row-location-specific conditional styles. Such row-location-specific conditional styles can include specified background color, cell padding, and paragraph styles or specific rows in the table. Examples of specific rows in the table include the first row in the table, the last row in the table, the second row in the table, the second from last row in the table, or any other location linked to the position of a row in the table. As described herein, a specified row location is the location specified by a row-location-specific property.

The sub-record 330 includes an entry 334 in the category 306. The entry 334 indicates that conditional styles should be updated if the row insertion is located at or above a row specified in a row-location-specific property indicated by the entry 332. Thus, for row insertions located below a specified row location of a row-location-specific property, conditional styles of the table will not be updated since the row insertion will not affect the relative position of cells having row-location-specific properties. The sub-record 330 includes two entries 336 and 338 in the category 308. The entry 336 indicates that conditional styles of rows at and adjacent to the insertion location should be updated. The entry 338 indicates that conditional styles of rows at and adjacent to the specified row location should be updated.

The sub-record 340 includes an entry 342 in the category 304 indicating that the sub-record 340 is associated with cell-specific properties. Cell-location-specific properties include properties linked to the relative position of a cell within a table. Examples of relative positions include a cell in the left most column and upper most row of a table, a cell in a right most column and lower most row of a table, and any other specification of a cell's position in the table. As described herein, a specified cell location is the location specified in a cell-location-specific property.

The sub-record 340 includes an entry 344 in the category 306. The entry 344 indicates that if the inserted row is located at or above a cell location specified in a cell-location-specific property of the entry 342, conditional styles of parts of the table may require updating. The sub-record 340 includes entries 346 and 348 in the category 308. The entry 346 indicates that conditional styles of rows at and adjacent to the location of the inserted row should be updated. The entry 348 indicates that conditional styles of cells at and adjacent to the cell location specified in the entry 342 should be updated.

The records 350, 360, and 370 have structures similar to the structure of the record 310. The record 350 includes an entry 352 in the column 302 indicating that the record 350 is associated with insertion of table columns. The record 360 includes an entry 362 in the category 302 indicating that the record 360 is associated with deletion of table rows. The record 370 includes an entry 372 in the category 302 indicating that the record 370 is associated with deletion of table columns. The style updater 132 searches the records 350, 360, and 370 in a manner similar to the searching of the record 310 described herein.

For insertion or deletion of multiple rows or columns, the style updater 132 can search and apply the records 300 as described above, but with the following modified definition of adjacency. The style updater 132 can adjust the definition of adjacency by adjusting the number of rows or columns subject to insertion or deletion. For example, if two rows are inserted, instead of updating styles at the row immediately above and the row immediately below the insertion location, the style updater can update conditional styles at the two rows immediately above and the two rows immediately below the insertion location. The style updater 132 can adjust the definition of adjacency in a similar manner for insertion or deletion of different numbers of rows or columns.

While the records 300 depict four examples of types of mutations to tables, the records 300 can also include records associated with other types of mutations to other types of elements of electronic documents. For example, the records 300 can include records associated with insertion or deletion of items in a list, headings in a document, captions in a document, and other elements of electronic documents having structure.

Figure 4:
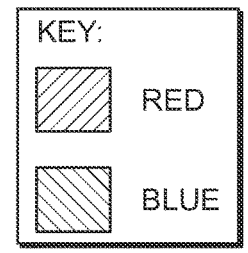
FIG. 4 depicts three successive renderings of a table with a row banding conditional style while undergoing insertion of a row, according to an illustrative implementation.

FIG. 4 depicts updating conditional styles in a table upon insertion of a table row, according to the systems and methods described herein. FIG. 4 includes three successive renderings of a table, renderings 400, 430, and 460. The table depicted in FIG. 4 has a conditional style of row banding specifying that the background color of a row is determined by the row's position in the table. Specifically, the conditional style specifies that rows having row indices with odd parity have a background color property value of red, and rows with row indices having even parity have a background color property value of blue. In this example, the background color property value is not linked to the text of a particular cell or row, but rather to a cell's position in the table. The rendering 400 includes rows 402, 404, 406, and 408. The rows 402 and 406 are the first and third rows of the table, and thus their row indices have odd parity. Since the row indices of rows 402 and 406 have odd parity, the background color properties of cells in rows 402 and 406 have values of red. The rows 404 and 408 are the second and fourth rows of the table, respectively, and thus their row indices have even parity. Since the row indices of rows 404 and 408 have even parity, cells in the rows 404 and 408 have a background color property value of blue.

The rendering 430 depicts the table shown in the rendering 400 after a row insertion. The rendering 430 includes rows 432, 434, 435, 436, and 438. The row 435 is inserted between the two previously existing rows 434 and 436. Prior to operation of the style updater 132, the table as depicted in the rendering 430 has incomplete banding, since the adjacent rows 435 and 436 have the same background color.

The rendering 460 depicts the table after the operation of the style updater 132. The rendering 460 includes rows 462, 464, 465, 466, and 468. The style updater 132 has searched the set of records 300, determined that the received mutation (a table row insertion) is associated with the record 310, has determined that the table includes a conditional style of row banding associated with the sub-record 320, has determined that the location of the row insertion satisfies the conditions of the entry 324, and has updated the background color properties of the row banding conditional style of the table at the locations specified by the entries 326 and 328. Accordingly, the style updater 132 has updated the rows 464, 465, and 466 since these rows are at and adjacent to the insertion location. Since one row was inserted, cells having a distance of one row from the insertion location are deemed to be adjacent cells. Furthermore, the style updater 132 updates the background color property of the row 468 since the row 468 is below the location of the insertion. The style updater 132 does not update the background color property of the row 462 since the location of the row 462 does not meet the conditions specified in the entries 326 and 328. By only updating subsets of the table specified by the set of records 300, the style updater has an improved performance, since unnecessary operations are not performed. This improved performance may especially be useful on low-power devices such as mobile devices, or when implementing document editing applications using a network. The advantages are reduced power consumption, reduced network traffic, and faster update rates.

Figure 5:
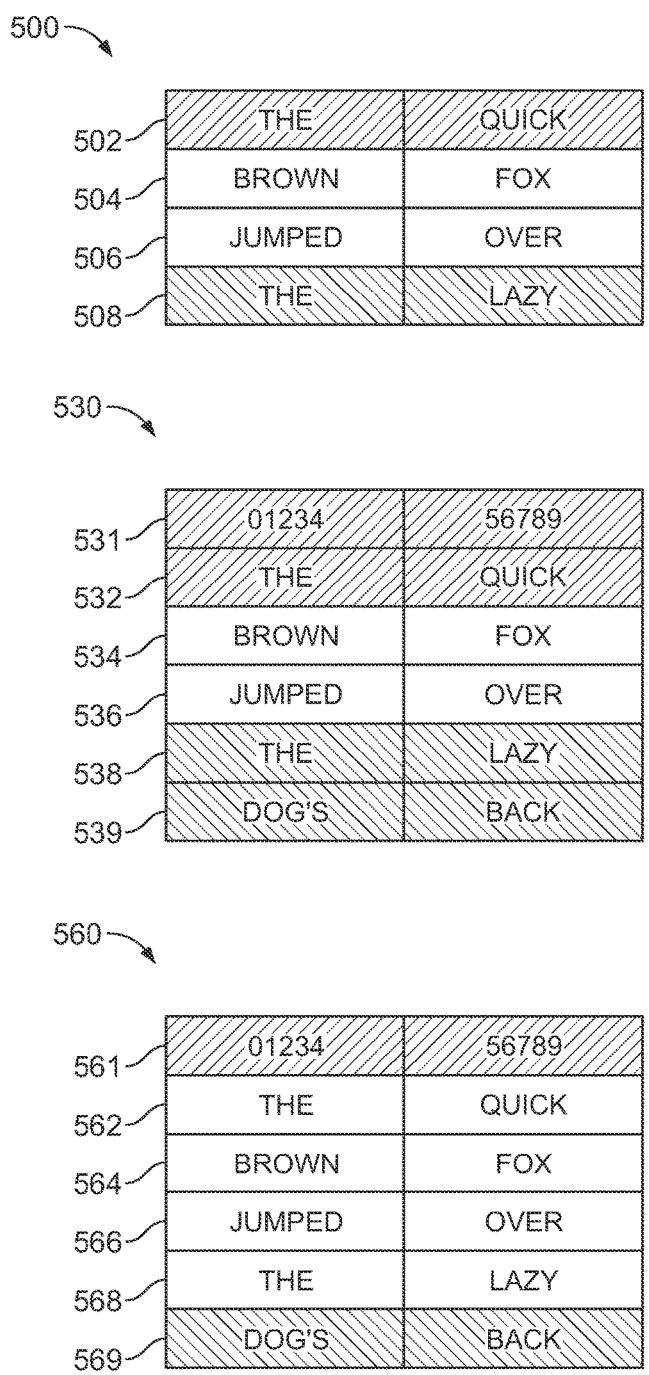
FIG. 5 depicts three successive renderings of a table with a row-location-specific conditional style while undergoing insertion of a row, according to an illustrative implementation.

FIG. 5 depicts three successive renderings of a table with a row-location-specific conditional style while undergoing insertion of a row. FIG. 5 includes renderings 500, 530, and 560, each depicting the table at a point in time during the update process. The row-location-specific conditional style of the table depicted in FIG. 5 specifies that the first row has a background color property value of red and the last row has a background color property value of blue. This conditional style is linked to the position of rows within the table, and is not linked to the contents of the any cell within the row. Thus, the table should maintain these conditional styles upon changes to the table structure. The rendering 500 includes four rows of the table, rows 502, 504, 506, and 508. Since the row 502 is the first row in the table, the row 502 has a background color property value of red. Since the row 508 is the last row in the table, the row 508 has a background color property value of blue.

The rendering 530 depicts the table immediately after an insertion of a row above the previous first row and the insertion of a row below the previous last row. The rendering 530 includes the rows 531, 532, 534, 536, 538, and 539. The row 531 has been inserted above the previous first row, row 532. Before operation of the style updater 132, the row 531 takes the background color property value of the nearest row, row 532, and the row 532 has the same background color property value as the row 502 in the rendering 500. Before the operation of the style updater 132, the row 539 has a background color property value of the nearest row, row 538, and the row 538 has an unchanged background color property value. However, before the operation of the style updater 132, the table as rendered in the rendering 530 does not comply with its prescribed conditional style. Accordingly, the style updater 132 operates to update the table to comply with the prescribed conditional style.

The rendering 560 depicts the table after operation of the style updater 132. The rendering 560 includes the row 561, 562, 564, 566, 568, and 569. For each of the two row insertions, the style updater 132 has searched the set of records 300, determined that each of the received mutations (each a table row insertion) is associated with the record 310, determined that the table includes a row-location-specific conditional style associated with the sub record 332, determined that the locations of the row insertions meet the criteria specified by the entry 334, and has updated properties of conditional styles of rows in the locations specified by the entries 336 and 338. The rows 561, 562, 568, and 569 meet the location criteria specified in the entries 336 and 338 and are accordingly updated by the style updater 132. The rows 564 and 566 do not meet the location criteria specified by the entries 336 and 338 and are accordingly not updated by the style updater 132. By only updating subsets of the table, the style updater 132 improves the performance of the application 106.

FIG. 6 depicts three successive renderings of a table with a cell border conditional style while undergoing insertion of a row. FIG. 6 includes three renderings, renderings 600, 630 and 660. The rendering 600 depicts the table prior to insertion of a row. The rendering 600 includes four rows, row 602, 604, 606, and 608. The table has a cell-location-specific conditional style specifying that the cell located in the first column and third row has a thick cell border. Since the style is a cell-location-specific style, the thick cell border is linked to the position of the cell within the table, and not the text of the cell.

The rendering 600 depicts the table after insertion of a row and before operation of the style updater 132. The rendering 630 includes five rows, rows 632, 634, 635, 636, and 638. The row 635 has been inserted between the rows 634 and 636. Since the style updater 132 has not operated on the table yet, the table as depicted in the rendering 630 does not comply with its prescribed conditional style.

The rendering 660 depicts the table after operation of the style updater 132. The rendering 660 includes five rows, rows 662, 664, 665, 666, and 668. The style updater 132 has searched the set of records 300, determined that the received mutation (insertion of a row) is associated with the record 310, as determined that the table has a cell-location-specific property associated with the sub-record 340, has determined that the location of the received mutation meets the criteria of the entry 344, and has updated conditional styles of cells and locations specified by the entries 346 and 348. Thus, since the cells in rows 664, 665, and 666 meet the location criteria of the entries 346 and 348, cells in these rows are updated. Cells in rows 662 and 668 are not updated by the style updater since these cells do not meet the location criteria of the entries 346 and 348.

FIG. 7 depicts three successive renderings of a table with a row-location-specific cell paragraph conditional style while undergoing insertion of a row. FIG. 7 includes three renderings, renderings 700, 730, and 760. The rendering 700 depicts the table prior to insertion of a row. The rendering 700 includes four rows, rows 702, 704, 706, and 708. The row-location-specific property of the table requires the underlying of text of cells in the first row. Accordingly, text in the cells of the row 702 is underlined.

The rendering 730 depicts the table after insertion of a row above the previous first row, but before operation of the style updater 132. The rendering 730 includes rows 731, 732, 734, 736, and 738. The row 731 has been inserted above the previous first row 732. Since the style updater 132 has not yet operated, the table does not comply with its prescribed conditional style.

The rendering 760 depicts the table after operation of the style updater 132. The rendering 760 includes five rows, rows 761, 762, 764, 766, and 768. The style updater 132 has searched the set of records 300, determined that the received mutation (a table row insertion) is associated with the record 310, has determined that the table has a row-location-specific property associated with the sub-record 330, has determined that the location of the received mutation meets the criteria of the entry 334, and has updated properties of cells at locations specified by the entries 336 and 338. Accordingly, the style updater 132 has updated cells in the rows 761 and 762. The style updater has not updated cells in the rows 764, 766, and 768, since they do not meet the location criteria of the entries 346 and 348. Since, for the conditional style present in the table depicted in FIG. 7, the depicted row insertion does not affect conditional styles of the rows 764, 766, and 768, updating of conditional styles in these rows is not necessary. Accordingly, by not updating conditional styles in the rows 764, 766, and 768, the style updater 132 improves the performance of the application 106.

Figure 8:
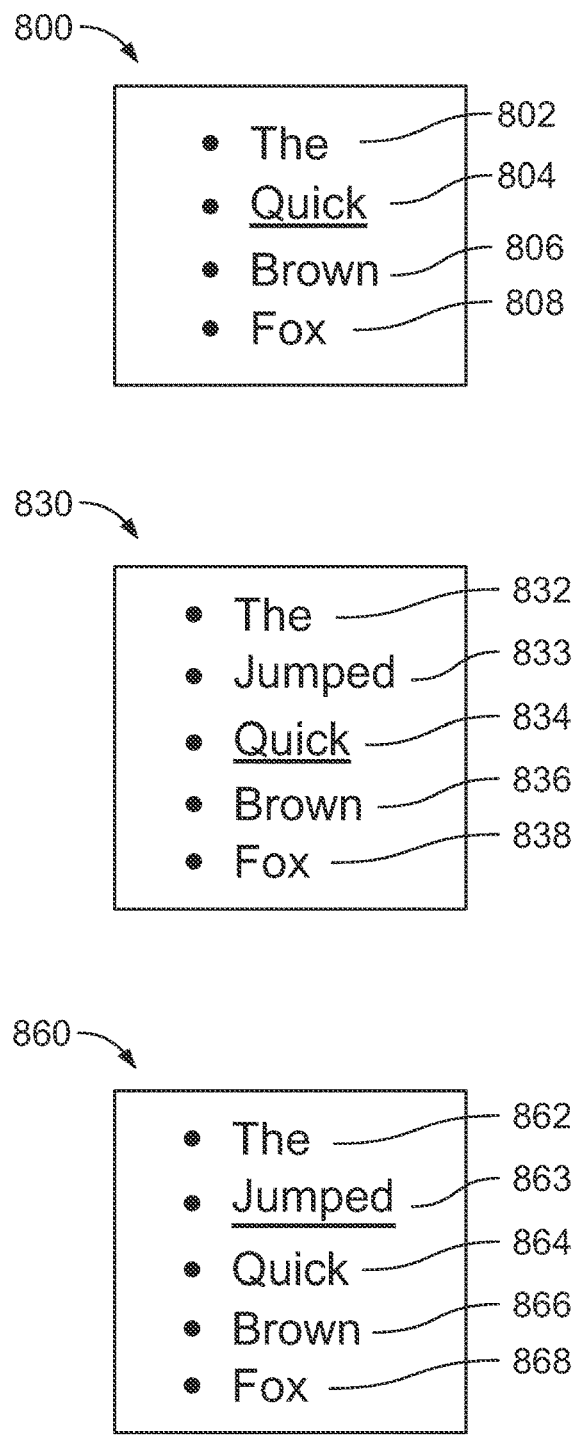
FIG. 8 depicts three successive renderings of a list having an item-location-specific conditional style while undergoing insertion of an item, according to an illustrative implementation.

FIG. 8 depicts three successive renderings of a list having an item-location-specific conditional style while undergoing insertion of an item. FIG. 8 depicts three renderings, renderings 800, 830, and 860. The rendering 800 depicts the list which contains four items, items 802, 804, 806, and 808. The list depicted in FIG. 8 is a bulleted list with a conditional style specifying that the second item in the list is underlined.

The rendering 830 depicts the list after insertion of an item and before operation of the style updater 132. The rendering 830 includes five items, items 832, 833, 834, 836, and 838. The item 833 has been inserted between the items 832 and 834. Since the style updater 132 has not operated on the list, the list does not comply with its prescribed conditional style.

The rendering 860 depicts the list after operation of the style updater 132. The rendering 860 includes five items, items 862, 863, 864, 866, and 868. The style updater 132 has searched the set of records 300, determined that the received mutation, insertion of a list item, is associated with an entry in category 302 of a record, has determined that the list has a conditional style associated with an entry in the category 304 of a sub record of the record, has determined that the location of the received mutation meets the criteria of an entry in the category 306 of the sub record, and has updated items meeting location criteria specified in entries of the sub record in category 308. Accordingly, the style updater 132 has updated items 862, 863, 864, and 866. After operation of the style updater 132, the list complies with its prescribed conditional style. By using the set of records 300 to determine a subset of the list to update, the style updater improves the performance of the application 106.

While FIGS. 4-8 depict insertions of rows into tables and insertion of an item into a list, the style updater 132 can be used for updating upon insertion of columns into a table, deletion of rows or columns from a table, deletion of items from a list, and other mutations to elements of electronic documents described herein.

Figure 9:
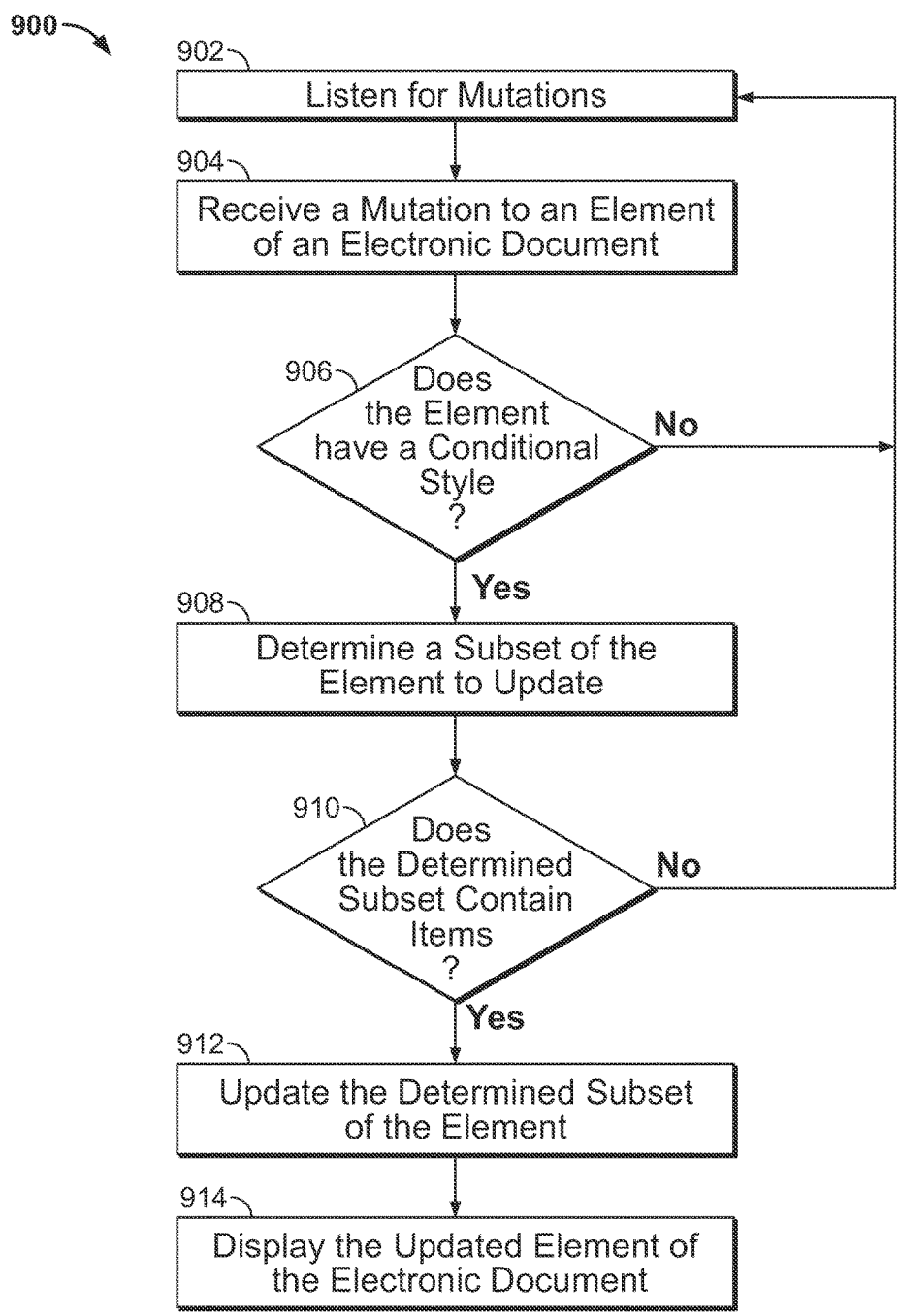
FIG. 9 is a flow chart of a method used to update a subset of an element of an electronic document upon receiving a mutation to the element, according to an illustrative implementation.

FIG. 9 is a flow chart of a method 900 used to update a subset of an element of an electronic document upon receiving a mutation to the element. At 902, the controller module 112 listens for mutations to the electronic document. The controller module 112 may listen by communicating with the user interface 118. At 904, a mutation to an element of the electronic document is received. The controller module 112 can receive this mutation from the user interface module 118. At 906, the style updater 132 determines whether the element has a conditional style. The style updater 132 can make this determination by searching the set of records 300a for entries into the category 302 matching properties of the element. If the element does not have a conditional style, the method returns to 902 to listen for further mutations.

If, at 906, the style updater 132 determines that the element has a conditional style, the method proceeds to 908. At 908, a subset of the element to update is determined. Determining a subset of the element to update can include searching the set of records 300 for entries meeting appropriate criteria in the categories 302, 304, 306, and 308. Determining a subset of the element to update can further include determining that the subset is an empty subset and in fact should not be updated. This determination not to update may be performed to improve performance based on the type of user device. In some examples, the subset of the element to update is determined as described with respect to FIG. 10.

At 910, the style updater 132 determines whether the determined subset contains items. If the determined subset is empty and does not contain items, the method returns to step 902 to listen for further mutations. If, at 910, the style updater 132 determines that the determined subset does contain items, the method 900 proceeds to 912.

At 912, the element of the electronic document is updated by updating properties of items in the determined subset as described with respect to FIGS. 4-8. Since the style updater 132 only updates the determined subset and not the entire element, the style updater 132 improves the performance of the application 106.

At 914, the updated element is displayed. The view module 110 can display the updated element via the interface 118.

Figure 10:
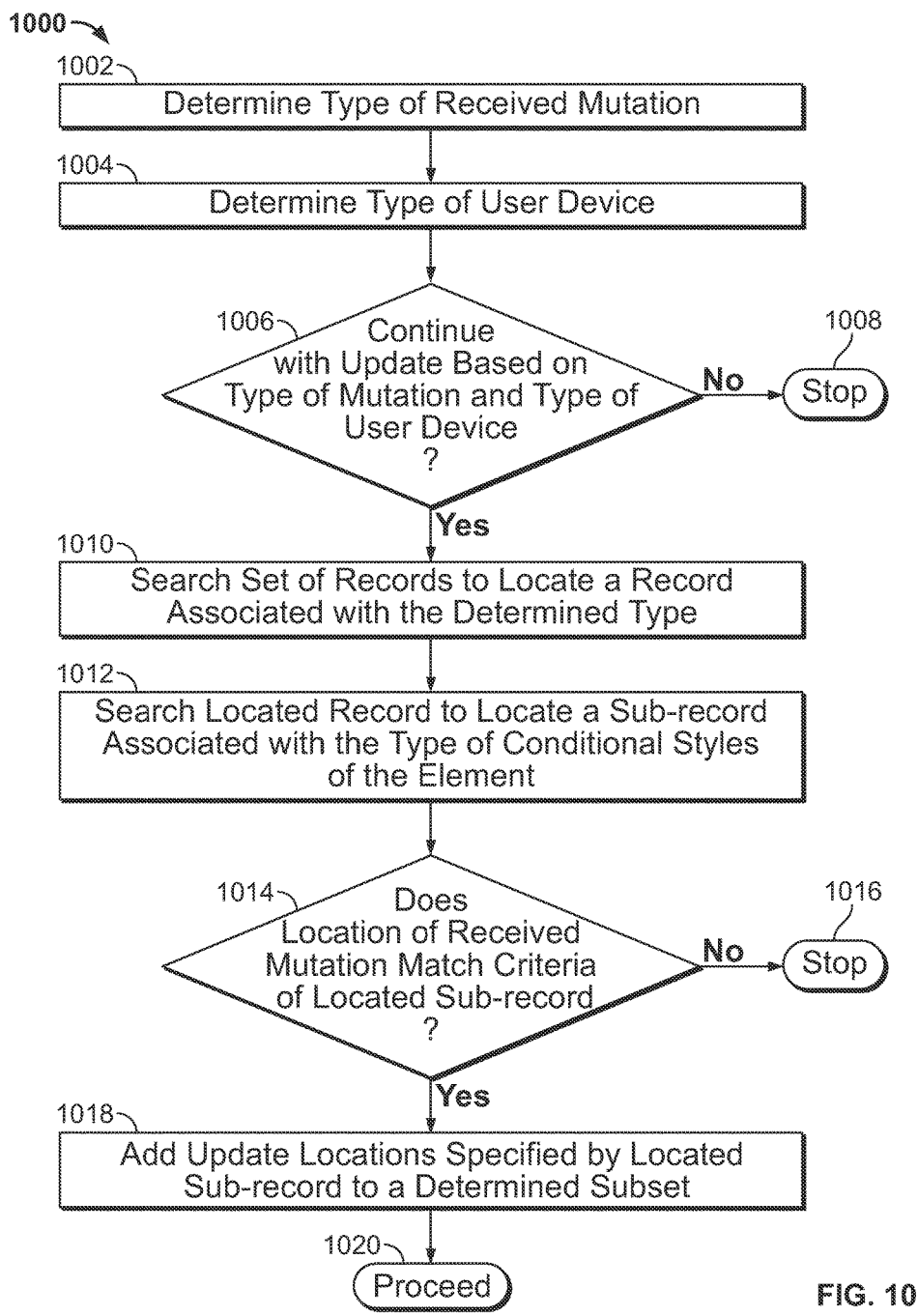
FIG. 10 depicts a flowchart of a method used to determine a subset of an element to update, according to an illustrative implementation.

FIG. 10 depicts a flowchart of a method 1000 used to determine a subset of an element to update. The method 1000 can be used to implement step 908 of the method 900. At 1002, the type of received mutation is determined. The style updater 132 can make this determination by determining whether the received mutation is a structural modification to an element of the electronic document.

At 1004, the type of user device is determined. The style updater 132 may make this determination by checking a registry, an operating system, a database, or other methods known in the art.

At decision block 1006, the style updater 132 determines whether to continue with the update based on the determined type of user device. The style updater 132 may be configured to not perform updates for certain types of user devices to improve speed and usability on these devices. For example, users of mobile devices with stringent power consumption requirements and small screen sizes may not benefit from frequent updates of some types of conditional styles. Accordingly, the style updater 132 may be configured not to perform updates for certain types of conditional styles for documents displayed on certain types of user devices. Determining whether to continue with the update at decision block 1006 may thus include determining whether one or more of the type of received mutation, types of conditional styles present in the element, and the location of the received mutation satisfy one or more criteria for continuing with the update.

If, at decision block 1006, the style updater 132 determines not to continue with the update, the method 1000 proceeds to step 1008. At step 1008, the method 1000 terminates.

If, at decision block 1006, the style updater 132 determines to continue with the update, the method 1000 proceeds to step 1010. At 1010, a set of records is searched to locate a record associated with the determined type. The style updater 132 can search the set of record 300 to determine whether the determined type is associated with an entry in the category 302 of a record in the set of records 300. Once a record associated with the determined type is located, the method proceeds to 1012.

At 1012, the located record is searched to locate a sub-record associated with a type of conditional style of the element. The style updater 132 can search the located record to determine whether an entry in the category 304 of the located record is associated with a type of conditional style of the element. After locating a sub-record, the method 1000 proceeds to decision block 1014.

At decision block 1014, the style updater 132 determines whether the location of the received mutation matches one or more criteria of the located sub-record. The style updater 132 can determine whether an entry of the sub-record in the category 306 is associated with the location of the received mutation. If the location of the received mutation does not match criteria of the located sub-record, the method 1000 proceeds to step 1016, where the method 1000 terminates.

If, at decision block 1014, the style updater 132 determines that the location of the received mutation matches one or more criteria of the located sub-record, the method 1000 proceeds to step 1018. At 1018, update locations specified by the located sub-record are added to a determined subset. The determined subset may be stored in memory as a variable, an array, or other data structure.

At step 1020, the method 1000 terminates and the style updater 132 proceeds with updating. In some examples, after step 1020, the style updater may proceed to follow the steps of the method 900 beginning at step 912. By dynamically determining whether to update based on the type of user device displaying the electronic document, the method 1000 can optimize editing performance for the type of user device.

Figure 11:
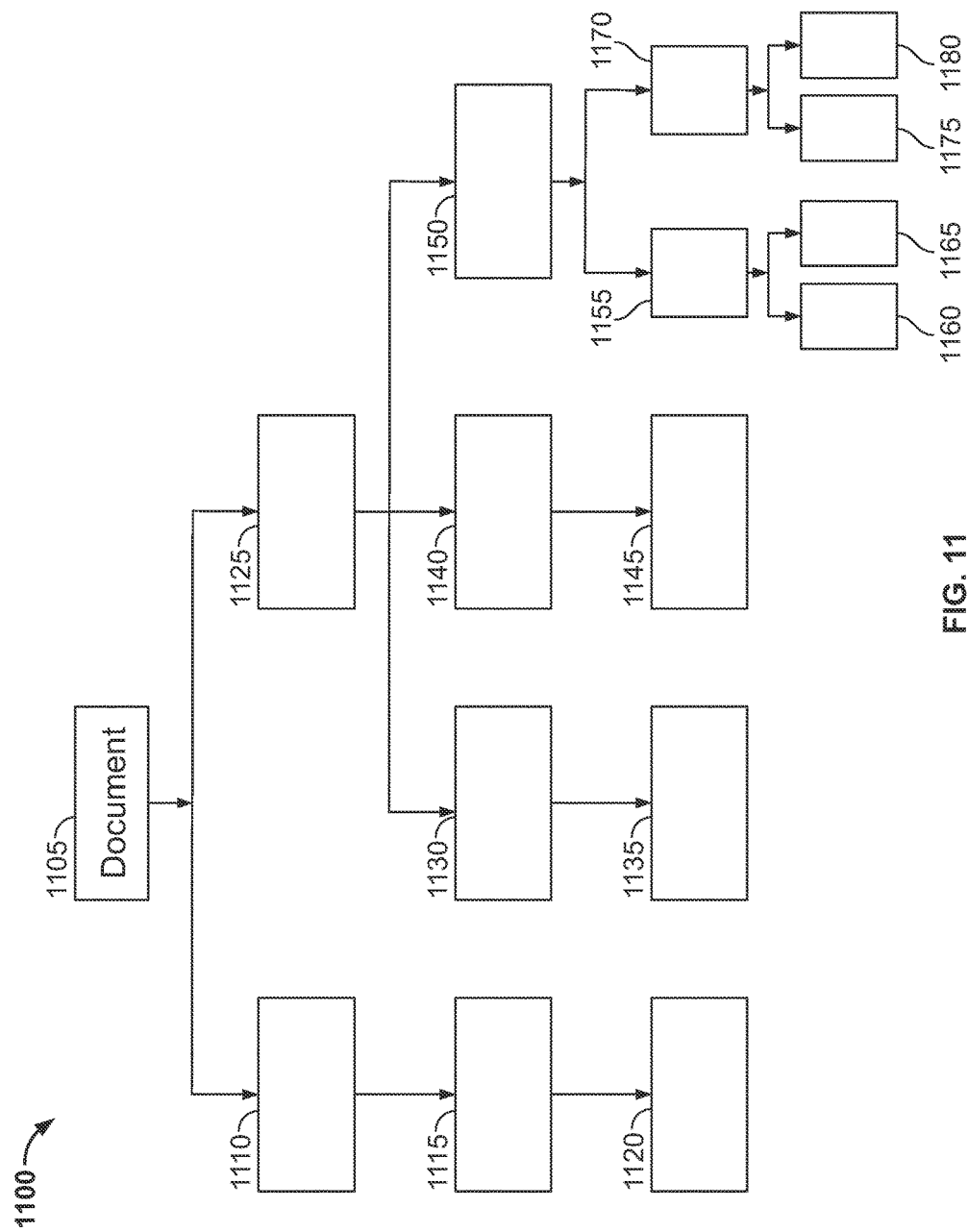
FIG. 11 schematically illustrates a document object model (DOM) used to edit and render a document file, according to an illustrative implementation.

FIG. 11 schematically illustrates a document object model (DOM) 1100 used to edit and render a document file. A document file may refer to a file containing a word processing document, a spreadsheet document, a presentation document, a drawing document, a database document, a HTML document, a XML document, an image document, a text document, or any other document file containing user data. In the DOM 1100, objects of the document 1105 are arranged as nodes in a hierarchy. An object may be a feature of the file. A node may have one or more nodes below it in the hierarchy, and a node may have one or more nodes above it in the hierarchy. For example, node 1115 has node 1120 below it and node 1110 above it. Similar nodes may be at the same level in the hierarchy. For example, nodes 1130, 1140, and 1150 may be at the same level in the hierarchy. In one example, a model-view-controller (MVC) implementation is used to create and edit the DOM 1100, and to display the contents of the DOM 1100 to a user. In this example, the model portion of the MVC parses a file and places sections of the file corresponding to objects of the document 1105 into nodes of the DOM 1100. The MVC implementation may be implemented by the model module 108, the view module 110, and the controller module 112. The MVC implementation may also be implemented by the model module 208, the view module 210, and the controller module 212. The DOM 1100 may be implemented by the model module 108 or the model module 208.

For example, a paragraph may be placed into node 1150 of the DOM 1100, and a sentence in the paragraph may be placed in node 1155. One word of the sentence may be placed into node 1160, and another word may be placed into node 1165. Another sentence of the paragraph may be placed into node 1170, with its words placed in nodes 1175 and 1180. For clarity of illustration, only two sentence nodes and four word nodes are described above and in FIG. 11, but a paragraph may have any number of sentences and corresponding sentence nodes, and a sentence may have any number of words and corresponding word nodes. In another example, a table may be placed into the node 1150 of the DOM 1100, with table row elements placed in nodes 1155 and 1170. The contents of each cell in the table rows may be placed in nodes 1160, 1165, 1175, and 1180, respectively. Tables may have any number of rows and row nodes, and rows may have any number of cell nodes, but two row nodes and four cell nodes are described here for clarity of illustration. In another example, tables may be placed into the DOM 1160 with columns as the primary index. In this example, nodes 1155 and 1170 correspond to columns of the table, and nodes 1160, 1165, 1175, and 1180 correspond to contents of each cell in the table columns. In an example, node 1110 may contain header information of the document. Node 1115 may contain a sentence of the header, and node 1120 may contain a word of the header sentence.

For clarity of illustration, node 1110 has only one subordinate node 1115, which itself has only one subordinate node 1120. Furthermore, as illustrated, the DOM 1100 has four levels of hierarchy. However, any node in a DOM may have any number of subordinate nodes, and a DOM may have any number of levels of hierarchy.

After the model portion creates the DOM 1100 and places contents into nodes, the view portion of a MVC may then traverse node-by-node through the DOM 1100 and render some or all of the objects contained in the nodes of the DOM 1100. The view portion may be a rendering engine and may be implemented by the view module 110 or the view module 210. As the view portion traverses through each node of the DOM 1100, it will render the contents of the node if it is configured to do so. The view portion may use hard-coded logic to decode or parse the contents of each node as it encounters the node while traversing. If the hard-coded logic is configured to decode or parse the contents of the node, the view portion will render the contents of the node for display to a user. If the hard-coded logic is not configured to decode or parse the contents of the node, the view portion will not render the contents of the node and will traverse to another node. In an example, the view portion may traverse through the DOM 1100 concurrently while the model portion is creating or updating the DOM 1100.

The controller portion of a MVC may interact with the view portion and the model portion of the MVC to facilitate editing of the document 1105 represented by the DOM 1100. The controller portion may be implemented by the controller module 112 or the controller module 212. When a user provides an editing input, the controller receives the input, determines the node of the DOM 1100 to which the input corresponds, and updates the corresponding node. The controller then instructs the view portion of the MVC to render the updated node. The update to the DOM 1100 must be validated for correctness. This validation may occur before or after the view portion renders the updated node. In an example, the controller may perform optimistic updating of the DOM 1100. In this example, the controller portion sends the update directly to the view portion for immediate rendering, and asynchronously updates and validates the DOM 1100. If the validation is successful, no further action is taken with regards to the update. If the validation is unsuccessful, the update to the DOM 1100 is reversed, and the view portion renders the DOM 1100 as it existed prior to the update. Such optimistic updating provides faster displaying of user edits. By classifying features of the document 1105 in a hierarchical structure, the view and controller portions can efficiently interact with the DOM 1100 to display and edit the document 1105.

Figure 12:
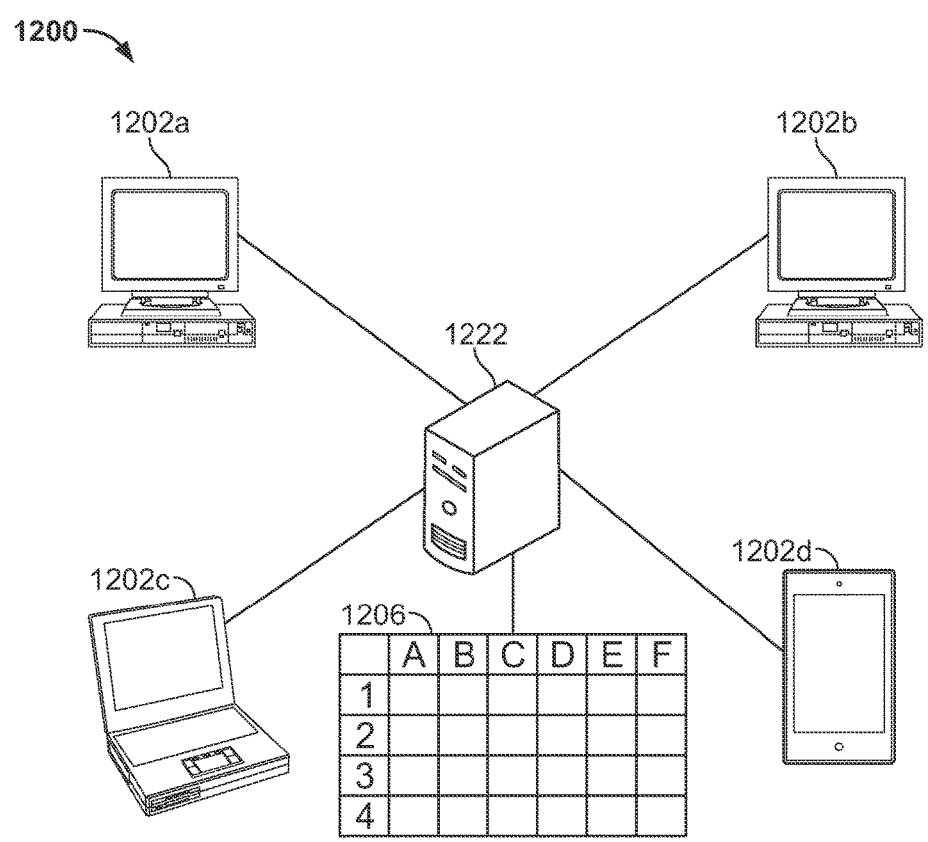
FIG. 12 is a block diagram of a cloud computing service, according to an illustrative implementation.

FIG. 12 shows a client-server system 1200 that includes a cloud computing service 1202 and a number of client devices 1204a-1204d (generally, client device 1204). The cloud computing service 1202 may be implemented on the server 222. The client devices 1204 may be either or both of the user devices 102 and 202. The cloud computing service 1202 provides cloud computing services for the set of client devices 1204. In particular, the cloud computing service 1202 may include one or more servers that store a number of files accessible by the client devices 1204a-1204d, such as an exemplary collaborative spreadsheet 1206. Users at the client devices 1204 may create, edit, copy, share, and delete files stored on the cloud computing service 1202. For example, the client devices 1204 may each use a web browser to simultaneously access the spreadsheet 1206 on the cloud computing service 1202. The cloud computing service 1202 provides each client device 1204 with a local copy of the spreadsheet 1206, which users on the client devices 1204 may then view and edit. The cloud computing service 1202 may synchronize the local copies of the spreadsheet 1206 with one another and with a copy of the spreadsheet 1206 that is stored on a server in the cloud computing service 1202. In one example, edits, which may be referred to herein as changes, that are made by the client device 1204a are automatically sent to the cloud computing service 1202 and transmitted to the other client devices 1204b, 1204c, and 1204d. In this manner, changes made by one collaborator may be immediately seen by other collaborators.

As used herein, a file includes a set of digitally encoded bits stored on a storage medium. A cloud file includes a file that is stored on a server and accessible via a network. A local file includes a file stored on a user's local device. A client device includes a local device that communicates with a server in a client-server relationship. As used herein, a client device is synonymous with a user device and a local device, unless indicated otherwise by context. As used herein, a document can be associated with multiple files. For example, a cloud file may be a copy of a document stored on a server, and a local file may be a copy of the same document stored on a local device. Generally, multiple copies of the same document may be identical, but they may differ if changes made by one collaborator have not yet been transmitted to other collaborators. This situation may occur when the network connection is slow or intermittent. Multiple copies of the same document may also differ slightly if the copies are stored on disparate types of devices, such as devices with different operating systems. In this case, different copies may have slightly different metadata, or may be encoded differently. For example, one copy may be encoded in a format in which the first bit in a byte contains the most significant bit, and another copy may be encoded in a format in which the first bit in a byte contains the least significant bit. These format differences can exist across multiple files that are copies of the same document, as long as the substance of the information that is displayed to the user is the same across the copies. A local device may read the contents of a file (stored in non-volatile memory) and store a model representing the file in working memory. The working memory may be volatile (e.g. RAM or an equivalent).

The client devices 1204 may include any combination of desktop computers, laptop computers, tablets, smart phones, mobile electronic devices, or any other device that may connect to the cloud computing service 1202 through a network. Only four client devices 1204 are shown in system 1200, but it should be understood that any number of client devices 1204 of any type may be configured to communicate with the cloud computing service 1202. The cloud computing service 1202 and the client devices 1204 of the system 1200 may be connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

Figure 13:
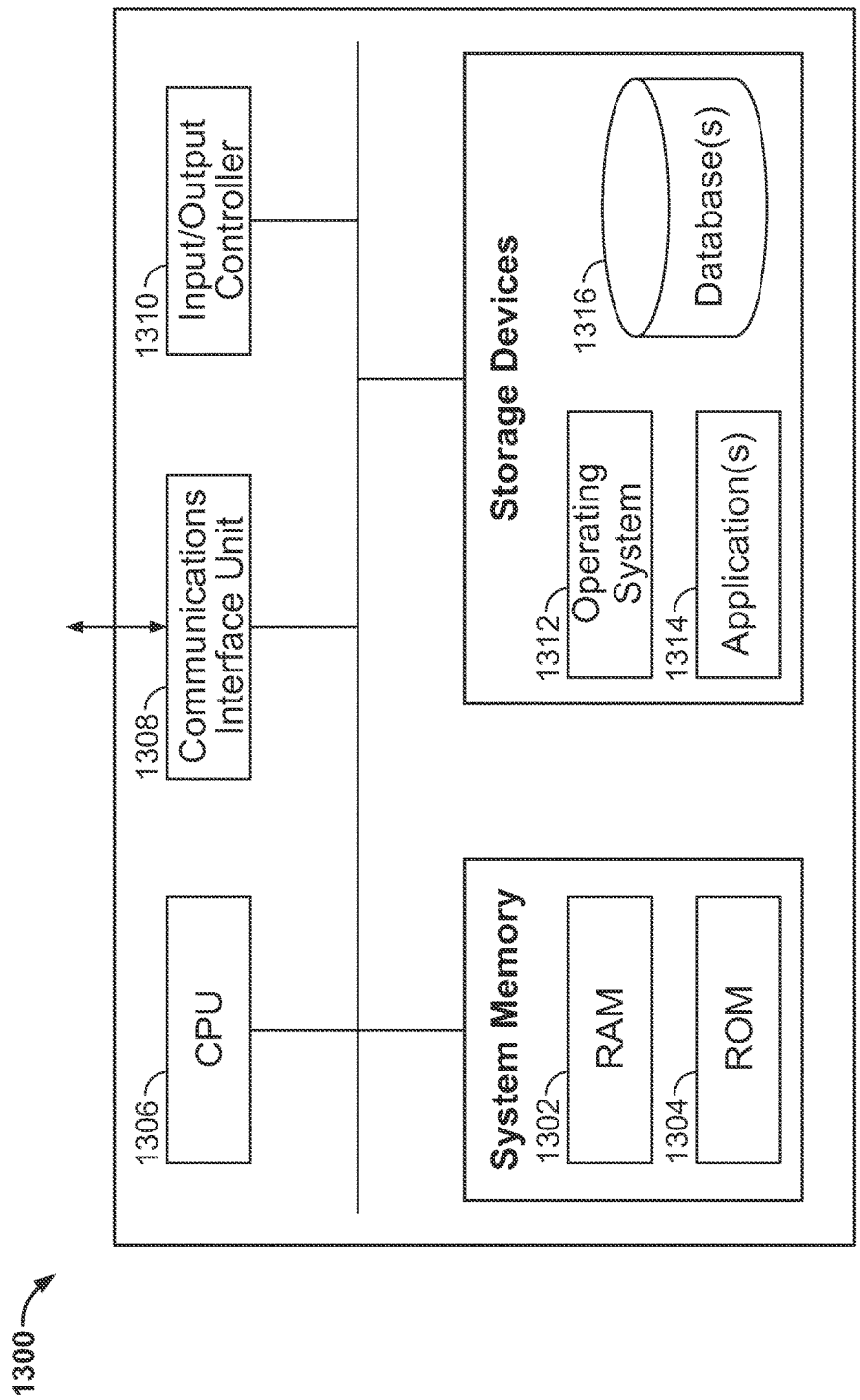
FIG. 13 is a block diagram of a computing device for performing any of the processes described herein, according to an illustrative implementation.

FIG. 13 is a block diagram of a computing device, such as any of the components of the systems of FIGS. 1-12, for performing any of the processes described herein. Each of the components of these systems may be implemented on one or more computing devices 1300. In certain aspects, a plurality of the components of these systems may be included within one computing device 1300. In certain implementations, a component and a storage device may be implemented across several computing devices 1300.

The computing device 1300 includes at least one communications interface unit, an input/output controller 1310, system memory, and one or more data storage devices. The system memory includes at least one random access memory (RAM 1302) and at least one read-only memory (ROM 1304). All of these elements are in communication with a central processing unit (CPU 1306) to facilitate the operation of the computing device 1300. The computing device 1300 may be configured in many different ways. For example, the computing device 1300 may be a conventional standalone computer or alternatively, the functions of computing device 1300 may be distributed across multiple computer systems and architectures. Alternatively, a computer system may be virtualized to provide the functions of multiple computing devices 1300. In FIG. 13, the computing device 1300 is linked, via network or local network, to other servers or systems.

The computing device 1300 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1308 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1306 includes a processor, such as one or more conventional microprocessors and one or more supplementary co-processors such as math co-processors for offloading workload from the CPU 1306. The CPU 1306 is in communication with the communications interface unit 1308 and the input/output controller 1310, through which the CPU 1306 communicates with other devices such as other servers, user terminals, or devices. The communications interface unit 1308 and the input/output controller 1310 may include multiple communication channels for simultaneous communication with, for example, other processors, servers or client terminals.

The CPU 1306 is also in communication with the data storage device. The data storage device may include an appropriate combination of magnetic, optical or semiconductor memory, and may include, for example, RAM 1302, ROM 1304, flash drive, an optical disc such as a compact disc or a hard disk or drive. The CPU 1306 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1306 may be connected to the data storage device via the communications interface unit 1308. The CPU 1306 may be configured to perform one or more particular processing functions.

The data storage device may store, for example, (i) an operating system 1312 for the computing device 1300; (ii) one or more applications 1314 (e.g., computer program code or a computer program product) adapted to direct the CPU 1306 in accordance with the systems and methods described here, and particularly in accordance with the processes described in detail with regard to the CPU 1306; or (iii) database(s) 1316 adapted to store information that may be utilized to store information required by the program.

The operating system 1312 and applications 1314 may be stored, for example, in a compressed, an uncompiled and an encrypted format, and may include computer program code. The instructions of the program may be read into a main memory of the processor from a computer-readable medium other than the data storage device, such as from the ROM 1304 or from the RAM 1302. While execution of sequences of instructions in the program causes the CPU 1306 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 1312, a database management system and "device drivers" that allow the processor to interface with computer peripheral devices (e.g., a video display, a keyboard, a computer mouse, etc.) via the input/output controller 1310.

The term "computer-readable medium" as used herein refers to any non-transitory medium that provides or participates in providing instructions to the processor of the computing device 1300 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1306 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1300 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A computer-implemented method for updating properties of an element of an electronic document, the method comprising:
   storing, in a data store, a plurality of associations between types of mutations, mutation locations, and subsets of the element to update, at least one of the subsets specifying items of the element to update based on predefined locations of the items relative to the mutation locations;
   receiving, at a processor, a mutation to the element;
   determining, using the processor, a type of the mutation, and a location of the mutation;
   retrieving from the data store, using the processor, one or more associations of the plurality of associations, the retrieved one or more associations pertaining to the determined type of the mutation and the determined location of the mutation;
   determining, using the processor and based on the retrieved one or more associations, a subset of the element to update, wherein the determined subset of the element specifies items of the element to update according to predefined locations of the specified items relative to the determined location of the mutation; and
   updating the element by updating the determined subset.

2. The method of claim 1, further comprising updating properties of the determined subset associated with a conditional style of the element.

3. The method of claim 1, wherein updating the element does not include updating portions of the element excluded from the determined subset.

4. The method of claim 1, wherein retrieving from the data store the one or more associations comprises retrieving a record from the data store that contains an association between the determined type of the mutation with a relative location of the subset.

5. The method of claim 1, wherein retrieving from the data store the one or more associations comprises retrieving a record from the data store that contains an association between the determined type of the mutation with a conditional style.

6. The method of claim 5, wherein determining the subset further comprises determining, based on the conditional style, that the subset is an empty subset.

7. The method of claim 1, wherein determining the subset comprises determining, based on the determined type of the mutation, that the subset is an empty subset.

8. The method of claim 1, further comprising:
determining, using the processor, a type of user device displaying the electronic document; and wherein:
determining the subset further comprises determining, based on the type of user device, that the subset is an empty subset.

9. The method of claim 8, wherein determining the subset further comprises determining, based on the determined type of the mutation, that the subset is an empty subset.

10. The method of claim 8, wherein determining the subset further comprises determining, based on a conditional style of the element, that the subset is an empty subset.

11. A system for updating properties of an element of an electronic document, comprising:
a memory; and
a processor, coupled to the memory, to:
store, in a data store, a plurality of associations between types of mutations, mutation locations, and subsets of the element to update, at least one of the subsets specifying items of the element to update based on predefined locations of the items relative to the mutation locations;
receive a mutation to the element;
determine a type of the mutation, and a location of the mutation;
retrieve from the data store, one or more associations of the plurality of associations, the retrieved one or more associations pertaining to the determined type of the mutation and the determined location of the mutation;
determine, based on the retrieved one or more associations, a subset of the element to update, wherein the determined subset of the element specifies items of the element to update according to predefined locations of the specified items relative to the determined location of the mutation; and
update the element by updating the determined subset.

12. The system of claim 11, wherein the processor is further to update properties of the determined subset associated with a conditional style of the element.

13. The system of claim 11, wherein updating the element does not include updating portions of the element excluded from the determined subset.

14. The system of claim 11, wherein to retrieve from the data store the one or more associations, the processor is to retrieve, from the data store, a record that contains an association between the determined type of the mutation with a relative location of the subset.

15. The system of claim 11, wherein to retrieve from the data store the one or more associations, the processor is to retrieve a record from the data store that contains an association between the determined type of the mutation with a conditional style.

16. The system of claim 15, wherein to determine the subset, the processor is to determine, based on the conditional style, that the subset is an empty subset.

17. The system of claim 11, wherein to determine the subset, the processor is to determine, based on the determined type of the mutation, that the subset is an empty subset.

18. The system of claim 11, wherein the processor is further configured to determine a type of user device displaying the electronic document; and
wherein determine the subset, the processor is to determine, based on the type of user device, that the subset is an empty subset.

19. The system of claim 18, wherein to determine the subset, the processor is to determine, based on the determined type of the mutation, that the subset is an empty subset.

20. The system of claim 18, wherein to determine the subset, the processor is to determine, based on a conditional style of the element, that the subset is an empty subset.

21. A non-transitory computer-readable medium comprising instructions for updating properties of an element of an electronic document, which when executed by a processor, cause the processor to perform operations comprising:
storing, in a data store, a plurality of associations between types of mutations, mutation locations, and subsets of the element to update, at least one of the subsets specifying items of the element to update based on predefined locations of the items relative to the mutation locations;
receiving a mutation to the element;
determining a type of the mutation, and a location of the mutation;
retrieving from the data store, one or more associations of the plurality of associations, the retrieved one or more associations pertaining to the determined type of the mutation and the determined location of the mutation;
determining based on the retrieved one or more associations, a subset of the element to update, wherein the determined subset of the element specifies items of the element to update according to predefined locations of the specified items relative to the determined location of the mutation; and
updating the element by updating the determined subset.

* * * * *